(12) United States Patent
Hasegawa et al.

(10) Patent No.: US 7,539,368 B2
(45) Date of Patent: May 26, 2009

(54) ARRAYED WAVEGUIDE GRATING

(75) Inventors: Junichi Hasegawa, Tokyo (JP);
Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/041,231

(22) Filed: Mar. 3, 2008

(65) Prior Publication Data

US 2008/0199130 A1 Aug. 21, 2008

Related U.S. Application Data

(63) Continuation of application No. PCT/JP2006/317436, filed on Sep. 4, 2006.

(30) Foreign Application Priority Data

Sep. 2, 2005 (JP) ............................ 2005-254672

(51) Int. Cl.
*G02B 6/12* (2006.01)
*G02B 6/34* (2006.01)

(52) U.S. Cl. .......................................... 385/14; 385/37

(58) Field of Classification Search ................ 385/37
See application file for complete search history.

(56) References Cited

U.S. PATENT DOCUMENTS

| | | | |
|---|---|---|---|
| 6,442,314 B2 | 8/2002 | Nara et al. | |
| 6,456,763 B2 * | 9/2002 | Kashihara et al. | 385/37 |
| 6,490,395 B1 * | 12/2002 | Nara et al. | 385/39 |
| 6,501,882 B2 | 12/2002 | Kashihara et al. | |
| 6,501,896 B2 | 12/2002 | Nara et al. | |
| 6,504,983 B1 | 1/2003 | Nara et al. | |
| 6,539,158 B2 | 3/2003 | Kashihara et al. | |
| 6,563,986 B2 * | 5/2003 | Kashihara et al. | 385/37 |

(Continued)

FOREIGN PATENT DOCUMENTS

JP     2000-19445 A     1/2000

OTHER PUBLICATIONS

Junichi Hasegawa, et al., "Ondo Muizon AWG Module no Kaihatsu", Development of Athermal AWG Module, Technical Report of IEICE, vol. 103, No. 35, 2003, pp. 1 to 4 (with English Abstract).

(Continued)

*Primary Examiner*—Tina M Wong
(74) *Attorney, Agent, or Firm*—Oblon, Spivak, McClelland, Maier & Neustadt, P.C.

(57) ABSTRACT

An arrayed waveguide grating has optical input waveguides, a first slab waveguide, an arrayed waveguide comprising plural waveguides of mutually-different lengths, a second slab waveguide and plural optical output waveguides. The first slab waveguide is divided along division surfaces crossing the light path into divided slab waveguides. The divided slab waveguide is temperature-dependently moved along the division surfaces by sliding members which are formed of members exhibiting different expansion/contraction corresponding to temperature change. The sliding members are configured to move the divided slab waveguide in their respective mutually-different temperature ranges in the operating temperature range of the arrayed waveguide grating. A sliding distance of the divided slab waveguide is used as a temperature-dependence reduction amount that varies as temperature changes so as to reduce the temperature difference of the light transmission center wavelength of the arrayed waveguide grating.

9 Claims, 10 Drawing Sheets

U.S. PATENT DOCUMENTS

| | | |
|---|---|---|
| 6,567,587 B2 | 5/2003 | Kashihara et al. |
| 6,591,044 B2 | 7/2003 | Kashihara et al. |
| 6,631,235 B1 | 10/2003 | Kawashima et al. |
| 6,668,116 B2 * | 12/2003 | Kashihara et al. .............. 385/37 |
| 6,668,117 B2 | 12/2003 | Hasegawa et al. |
| 6,671,433 B2 | 12/2003 | Kashihara et al. |
| 6,728,435 B2 | 4/2004 | Kashihara et al. |
| 6,735,364 B2 | 5/2004 | Kashihara et al. |
| 6,757,453 B2 * | 6/2004 | Nekado et al. ................. 385/14 |
| 6,763,164 B2 | 7/2004 | Kashihara et al. |
| 6,768,832 B2 | 7/2004 | Nakajima et al. |
| 6,768,840 B2 | 7/2004 | Nara et al. |
| 6,769,817 B2 | 8/2004 | Saito et al. |
| 6,816,651 B2 | 11/2004 | Kashihara et al. |
| 6,826,332 B2 * | 11/2004 | Saito et al. .................... 385/37 |
| 6,829,418 B2 | 12/2004 | Kashihara et al. |
| 6,830,384 B2 | 12/2004 | Hasegawa et al. |
| 6,836,591 B2 | 12/2004 | Kashihara et al. |
| 6,870,979 B2 | 3/2005 | Kawashima et al. |
| 6,920,265 B2 | 7/2005 | Kashihara et al. |
| 7,010,184 B2 | 3/2006 | Hasegawa et al. |
| 7,072,545 B2 | 7/2006 | Nara et al. |
| 7,133,587 B2 | 11/2006 | Nara et al. |
| 7,146,079 B2 | 12/2006 | Nara et al. |
| 7,233,714 B2 | 6/2007 | Kawashima et al. |
| 2002/0018622 A1 | 2/2002 | Nara et al. |
| 2002/0028300 A1 | 3/2002 | Komatsu et al. |
| 2002/0085808 A1 | 7/2002 | Ooyama et al. |
| 2002/0154861 A1 | 10/2002 | Nara et al. |
| 2002/0181857 A1 | 12/2002 | Komatsu et al. |
| 2003/0016928 A1 | 1/2003 | Nara et al. |
| 2003/0039043 A1 | 2/2003 | Nekado et al. |
| 2003/0048989 A1 | 3/2003 | Kashihara et al. |
| 2003/0091289 A1 | 5/2003 | Saito et al. |
| 2003/0138221 A1 | 7/2003 | Hasegawa et al. |
| 2003/0142946 A1 | 7/2003 | Saito et al. |
| 2007/0104409 A1 | 5/2007 | Nara et al. |
| 2008/0031566 A1 | 2/2008 | Matsubara et al. |
| 2008/0131053 A1 | 6/2008 | Nara |

OTHER PUBLICATIONS

Junichi Hasegawa, et al., "C-3-91 Ultra-wide Temperature Range (-30-70° C.) Operation of Athermal AWG Module using Pure Aluminum Compensation Plate: Jun Aluminium Hoshoban o Mochiita Athermal AWG Module no Cho Koiki Ondo Dosa", 2006 Nen The IEICE Sogo Taikai Koen Ronbunshu, Electronics 1, 2006, p. 226.

* cited by examiner

A ↕ B

20°C < T < 50°C

T≧50°C

T≦20°C

ARRAYED WAVEGUIDE GRATING

TECHNICAL FIELD

The present invention relates to an arrayed waveguide grating handling the function of wavelength multiplexing/demultiplexing of optical signals of plural wavelengths.

BACKGROUND ART

In the optical communication field, there is used an arrayed waveguide grating as illustrated in a diagram of FIG. 11, for example. The arrayed waveguide grating has one or more optical input waveguides 2 arranged side-by-side (plural optical input waveguides are shown in the figure), a first slab waveguide 3 connected to output sides of the optical input waveguides 2, an arrayed waveguide 4 connected to the output side of the first slab waveguide 3, a second slab waveguide 5 connected to the output side of the arrayed waveguide 4 and one or more optical output waveguides 6 arranged side-by-side (plural optical output waveguides are shown in the figure).

The arrayed waveguide 4 is provided for propagating light output from the first slab waveguide 3 and has a plurality of waveguides (channel waveguides) 40 arranged side-by-side. Adjacent channel waveguides 40 are different in length by a predetermined length ($\Delta L$) and the arrayed waveguide 4 gives each signal a phase difference in the arrayed waveguide grating 11.

Typically, the arrayed waveguide 4 includes a large number of channel waveguides 40 or, for example, 100 waveguides, however in the figure, a small number of waveguides 40 are only shown for easy illustration.

In the arrayed waveguide grating 11, for example, when a wavelength division multiplexed optical signal comprising signals having wavelengths $\lambda 1, \lambda 2, \lambda 3, \ldots, \lambda n$ enters one optical input waveguide 2, this signal passes through the optical input waveguide 2 into the first slab waveguide 3. Then, the signal is diffracted and spread by the first slab waveguide 3 and is transmitted to the arrayed waveguide 4 to propagate therethrough.

After passing through the arrayed waveguide 4, the signals enter the second slab waveguide 5, converge on and then are output from optical output waveguides 6. As the channel waveguides 40 of the arrayed waveguide 4 are all different in length, a phase difference appears in each of the signals that have passed through the arrayed waveguide 4. Due to this phase difference, the wave fronts of the signals tilt and this tilt angle determines focal points of the signals.

For this reason, the focal points of the signals having different wavelengths differ from each other and accordingly the optical output waveguides 6 are formed at the respective focal points. With this configuration, the signals of different wavelengths are extracted by the optical output waveguides 6, respectively, thereby completing the function as a wavelength-division demultiplexer of the arrayed waveguide grating.

Moreover, as the arrayed waveguide grating takes advantage of the principle of reversibility of the optical circuit, the arrayed waveguide grating also handles the function as a wavelength-division multiplexer as well as a wavelength-division demultiplexer. That is, reversing the above-described procedure, when signals having differing wavelengths $\lambda 1, \lambda 2, \lambda 3, \ldots, \lambda n$ enter respective optical output waveguides 6, the signals passes through the above-mentioned propagation path in reverse, the signals are multiplexed by the second slab waveguide 5, the arrayed waveguide 4 and the first slab waveguide 3 and output from one optical input waveguide 2.

Generally, as the arrayed waveguide grating is made of silica-based glass, there occurs temperature fluctuation due to the temperature-dependent refractive index of the silica-based material. Specifically, as ambient temperature changes where the arrayed waveguide grating is placed, the light transmission center wavelength (center wavelength) of the arrayed waveguide grating changes dependently on the temperature, causing a shift of the center wavelength of about 0.8 nm over the general operating temperature range (−5° C. through 70° C.). In view of this, there was the need to control the temperature of the arrayed waveguide grating chip as a whole with use of Peltier elements or heaters.

Thus, there was a great demand for temperature independence (insensitivity) of the arrayed waveguide grating, and recently, the technique of compensating the temperature dependence of the center wavelength has been developed (development of an athermal arrayed waveguide grating). This technique has realized temperature-control-free arrayed waveguide gratings and no electric power supply (see non-patent documents 1 and 2).

FIG. 12 illustratively shows an example of a temperature-independent arrayed waveguide grating that was proposed conventionally. In this arrayed waveguide grating, a first slab waveguide 3 is cut at division surfaces 8 in a plane crossing the path of light passing through the slab waveguide 3 to constitute divided slab waveguides 3a and 3b. Moreover, the arrayed waveguide grating is also divided at surfaces 18 crossing the division surfaces 8 into a chip 1a and a chip 1b.

Further, there is provided a sliding member 7 for temperature-dependently moving the divided slab waveguide 3a along the division surface 8 in such a direction as to reduce the temperature dependence of the light transmission center wavelength of the arrayed waveguide grating (direction of the arrow A or B). Movement of this divided slab waveguide 3a by the sliding member 7 is utilized for realization of temperature independence of the light transmission center wavelength of the arrayed waveguide grating.

Non-patent document 1: Y. Inoue, A. Kaneko, F. Hanawa, H. Takahashi, K. Hattori, S. Sumida, "Athermal silica-based arrayed-waveguide grating multiplexer," Electron Lett., vol. 33, pp. 1945-1947, 1997

Non-patent document 2: T. Saito, K. Nara, Y. Nekado, J. Hasegawa, K. Kashihara, "100 GHz-32 ch athermal AWG with extremely low temperature dependency of center wavelength," OFC'03 MF47, pp. 57-59, 2003.

DISCLOSURE OF THE INVENTION

Problems to be Solved by the Invention

Meanwhile, in recent years, the WMD-PON (Wavelength Division Multiplexing-Passive Optical Network) system allowing simultaneous realization of broadcasting services and point-to-point transmission is intensively studied. In this system, the arrayed waveguide grating itself is likely to be installed outdoors, like optical splitters used in the conventional PON system. In such a case, the operating temperature range of the arrayed waveguide grating is −40° C. to 85° C., which range is harder and much wider than the operating temperature range (−5° C. to 70° C.) of the arrayed waveguide grating installed indoors.

However, in the conventionally proposed temperature-independent arrayed waveguide grating, it is observed that, as shown in FIG. 13, the temperature dependence of the center wavelength is not completely flat and presents a downward-convex shaped profile in which the positive direction of the center wavelength shift is upward, and reduction of the temperature dependence of the center wavelength of the arrayed waveguide grating was not completely achieved. More specifically, in the conventionally proposed temperature-independent arrayed waveguide grating, the light transmission center wavelength shift over the operating range of −5° C. to 70° C. is ±0.015 nm or better which presents no problem. However, when the operating temperature range is broadened to the range of −40° C. to 85° C., the center wavelength shift becomes larger to about ±0.04 nm problematically.

Here, in the example shown in FIG. 13, the arrayed waveguide grating is fabricated such that the light transmission center wavelength of the arrayed waveguide grating becomes zero at the temperature of 20° C.

Further, in construction of future networks which expect much more traffic, it is becoming necessary to narrow spacing of the arrayed waveguide grating. When the space becomes narrower, the tolerance of the temperature dependence of the center wavelength becomes smaller, and the center wavelength shift of the arrayed waveguide grating is required to be smaller than that of the conventional one (which is ±0.015 nm or better over the range of −5° C. to 70° C.).

Hence, as the conventional temperature-independent arrayed waveguide grating presents the problem of the temperature dependence of its center wavelength, there is a strong demand for development for an arrayed waveguide grating enabling further reduction of the temperature dependence of the center wavelength.

The present invention was carried out to solve the above-mentioned conventional problems. The present invention has an object to provide an arrayed waveguide grating capable of achieving further reduction of the temperature dependence of the light transmission center wavelength over its operating temperature range and less temperature-dependent center wavelength shift as compared with the conventional arrayed waveguide grating, even when the arrayed waveguide grating is installed outdoors, for example.

Means for Solving the Problems

In order to solve the above-mentioned problems, the present invention is configured as means for solving the problems. That is, the first aspect of the invention is an arrayed waveguide grating having a waveguide configuration formed on a substrate, the waveguide configuration including: one or more optical input waveguides arranged side-by-side; a first slab waveguide connected to an output side of the one or more optical input waveguides; an arrayed waveguide, connected to an output side of the first slab waveguide, for receiving light from the first slab waveguide to propagate the light therethrough, the arrayed waveguide having a plurality of waveguides of different lengths; a second slab waveguide connected to an output side of the arrayed waveguide; and one or more optical output waveguides arranged side-by-side and connected to an output side of the second slab waveguide, wherein at least one of the first slab waveguide and the second slab waveguide is divided along division surfaces in a plane crossing a path of the light passing through the corresponding slab waveguide into divided slab waveguides, a plurality of sliding members are provided for temperature-dependently moving at least one of the divided slab waveguides along the division surfaces in such a direction as to reduce temperature dependence of a light transmission center wavelength of the arrayed waveguide grating, the sliding members are formed of members which exhibit different expansion or contraction in response to temperature change, and the sliding members move the divided slab waveguide within respective mutually-different temperature ranges in an operating temperature range of the arrayed waveguide grating.

Here, the above-mentioned temperature ranges different from each other may include, for example, one temperature range of −50° C. to 70° C. and another temperature range of −5° C. to 20° C., which ranges can have common temperatures (for example, −5° C. to 20 in this example). Or, the above-mentioned temperature ranges different from each other may be those having no common temperature.

Further, a second aspect of the invention is characterized in that, in addition to the structure of the first aspect of the invention, at least two of the sliding members are formed different in length from each other.

Further, a third aspect of the invention is characterized in that, in addition to the structure of the first or second aspect of the invention, at least two of the sliding members are members of mutually-different materials.

Further, a fourth aspect of the invention is characterized in that, in addition to the structure of one of the first to third aspects of the invention, at least one of the sliding members is a separatable sliding member which is separatable at at least one part, at least one of the sliding members is unseparatable sliding member, and the separatable sliding member is arranged with separation surfaces which are in contact with each other within a contact temperature range in the operating temperature range of the arrayed waveguide grating and are arranged separated from each other and facing each other in other temperature ranges.

Further, a fifth aspect of the invention is characterized in that, in addition to the structure of the fourth aspect of the invention, the separatable sliding member comprises a plurality of separatable sliding members having mutually-different contact temperature ranges, and the expansion or contraction of the separatable sliding members within the respective contact temperature ranges and the expansion or contraction of the unseparatable sliding member are used to change the sliding distance of the divided slab waveguide correspondingly to the temperature change within each of the temperature ranges in the operating temperature range of the arrayed waveguide grating.

Further, a sixth aspect of the invention is characterized in that, in addition to the structure of the fifth aspect of the invention, the sliding members comprises a unseparatable-type first sliding member, a second sliding member having, as the contact temperature range, a first temperature range which is positioned at a higher-temperature side in the operating temperature range of the arrayed waveguide grating, and a third sliding member having, as the contact temperature range, a third temperature range which is positioned away from the first temperature range and at a lower-temperature side in the operating temperature range of the arrayed waveguide grating, in the first temperature range, sliding movement is performed corresponding to the expansion or contraction of the first sliding member and the second sliding member, in a second temperature range between the first temperature range and the third temperature range, the sliding movement is performed corresponding to the expansion or contraction of the first sliding member, and in the third temperature range, the sliding movement is performed corresponding to the expansion or contraction of the first sliding member and the third sliding member.

Effects of the Invention

According to the present invention, at least one of the first and second slab waveguides is divided along division surfaces in a plane crossing the path of light passing through the slab waveguide into divided slab waveguides, and a plurality of sliding members are provided for temperature-dependently moving one of the divided slab waveguides along the division surfaces in such a direction as to reduce the temperature dependence of the light transmission center wavelength of the arrayed waveguide grating. Therefore, these sliding members are used to move the divided slab waveguide, thereby significantly reducing the temperature dependence of the light transmission center wavelength of the arrayed waveguide grating as described below.

More specifically, according to findings of the inventors of the present application, with regard to the temperature dependence (wavelength shift) of the light transmission center wavelength of the arrayed waveguide grating, the temperature-dependent shift of the light transmission center wavelength has a downward-convex shape where the positive direction (shift toward longer-wavelength side) is upward, and in order to reduce the temperature dependence of the light transmission center wavelength of the arrayed waveguide grating by moving the divided slab waveguide along the division surfaces in the plane crossing the path of light passing through the slab waveguide, it is essential only that the sliding distance is changed correspondingly to the above-mentioned temperature characteristics and temperature-dependently.

According to further findings of the inventors of this application, such characteristics of the temperature-dependent light transmission center wavelength of the arrayed waveguide grating are attributable to changes of the temperature coefficient of dn/dT which expresses temperature dependence of the refractive index of the silica-based glass of the arrayed waveguide grating.

According to the present invention, the plural sliding members are made of materials which exhibit different expansion/contraction in response to the temperature change, the sliding members move the divided slab waveguide over the respective mutually different temperature ranges of the sliding members in the operating temperature range of the arrayed waveguide grating, and the sliding distance of the divided slab waveguide caused by the temperature-dependent expansion or contraction of the plural sliding members is defined as a temperature-dependence reduction amount which varies as temperature changes so as to reduce the temperature dependence of the light transmission center wavelength of the arrayed waveguide grating. With this configuration, the temperature dependence of the light transmission center wavelength of the arrayed waveguide grating can be reduced effectively by the sliding distance even if the shift of the light transmission center wavelength due to the temperature change is curve-shaped.

Hence, according to the present invention, it is possible to minimize the temperature dependence of the light transmission center wavelength of the arrayed waveguide grating.

In addition, in the present invention, as at least two sliding members of the plural sliding members are formed different in length, or at least two sliding members of the plural sliding members are formed of different materials, these differences provide the plural sliding members different expansion and contraction in response to the temperature change, thereby allowing exertion of the above-mentioned effects even with the simple configuration.

Further, in the present invention, the plural sliding members include at least one separatable sliding member that is separatable at one part and at least one unseparatable sliding member. The separatable sliding member is configured to have two separation surfaces which are arranged in contact with each other over its contact temperature range in the operating temperature range of the arrayed waveguide grating and are arranged separated from each other over the other temperature ranges. With this configuration, combination of the unseparatable sliding member and the separatable sliding member makes it possible to adjust the sliding distance of the divided slab waveguide accurately over the plural temperature ranges in the operating temperature range of the arrayed waveguide grating and to use the sliding distance as a temperature-dependence reduction amount which varies as temperature changes.

Furthermore, in the configuration of the present invention having the unseparatable sliding member and the separatable sliding member, the separatable sliding member comprises a plurality of separatable sliding members and their contact temperature ranges are differentiated from each other. Then, the expansion or contraction of each separatable sliding member in the contact temperature range and the expansion or contraction of the unseparatable sliding member are used as a basis to change the sliding distance of the divided slab waveguide correspondingly to the temperature changes within each of the plural temperature ranges in the operating temperature range of the arrayed waveguide grating. This configuration makes it possible to adjust the sliding distance of the divided slab waveguide accurately over the plural temperature ranges in the operating temperature range and to use the sliding distance as a temperature-dependence reduction amount which varies as temperature changes.

Furthermore, in the present invention, the sliding members include a first sliding member of the unseparatable sliding member type and second and third sliding members of the separatable sliding member type. In the mutually-different temperature ranges (first, second and third temperature ranges) in the operating temperature range of the arrayed waveguide grating, sliding is performed based on the expansion or contraction of corresponding sliding member(s) of the three sliding members. This configuration makes it possible to adjust the sliding distance of the divided slab waveguide accurately over the plural temperature ranges in the operating temperature range and to use the sliding distance as a temperature-dependence reduction amount which varies as temperature changes.

Figure 1A:
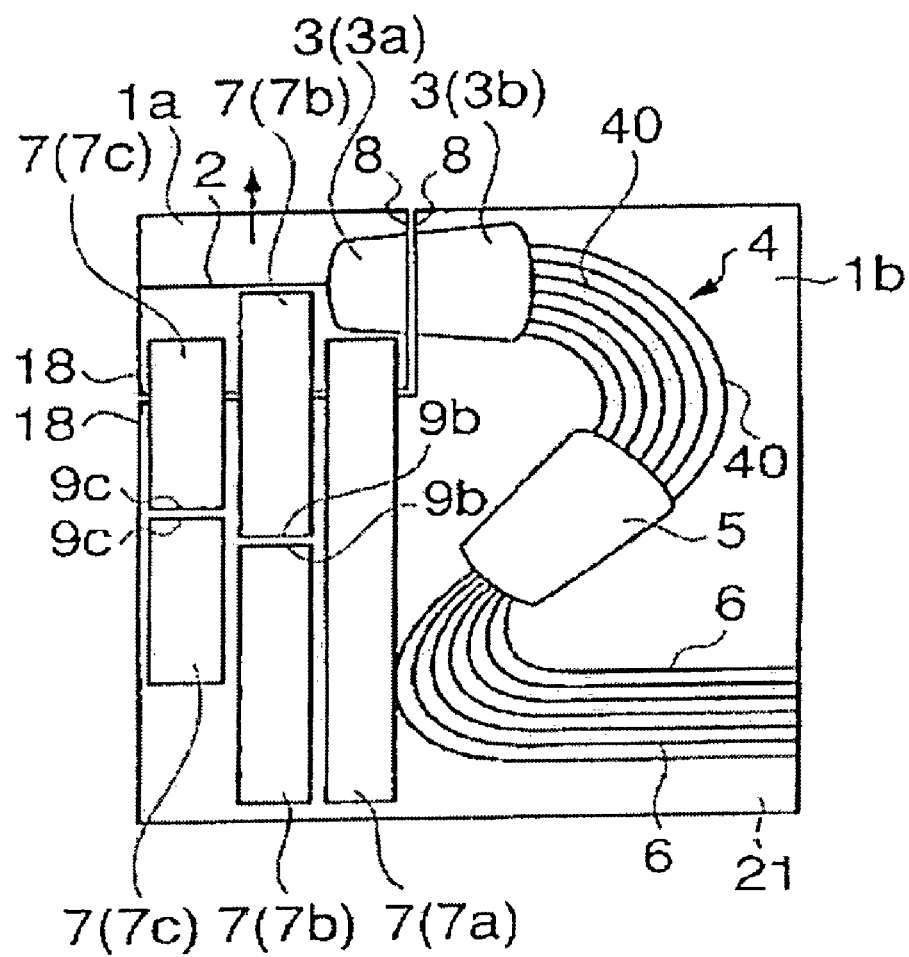
FIG. 1A is an explanatory view schematically illustrating an arrayed waveguide grating and its operation according to an embodiment of the present invention (where the temperature T of the arrayed waveguide grating satisfies 20° C.<T<50° C.)

DESCRIPTION OF REFERENCE NUMERALS 2 optical input waveguide
3 first slab waveguide
4 arrayed waveguide
5 second slab waveguide
6 optical output waveguide
7, 7a, 7b, 7c sliding member
8 division surface
21 substrate

BEST MODE FOR CARRYING OUT THE INVENTION

Figure 1B:
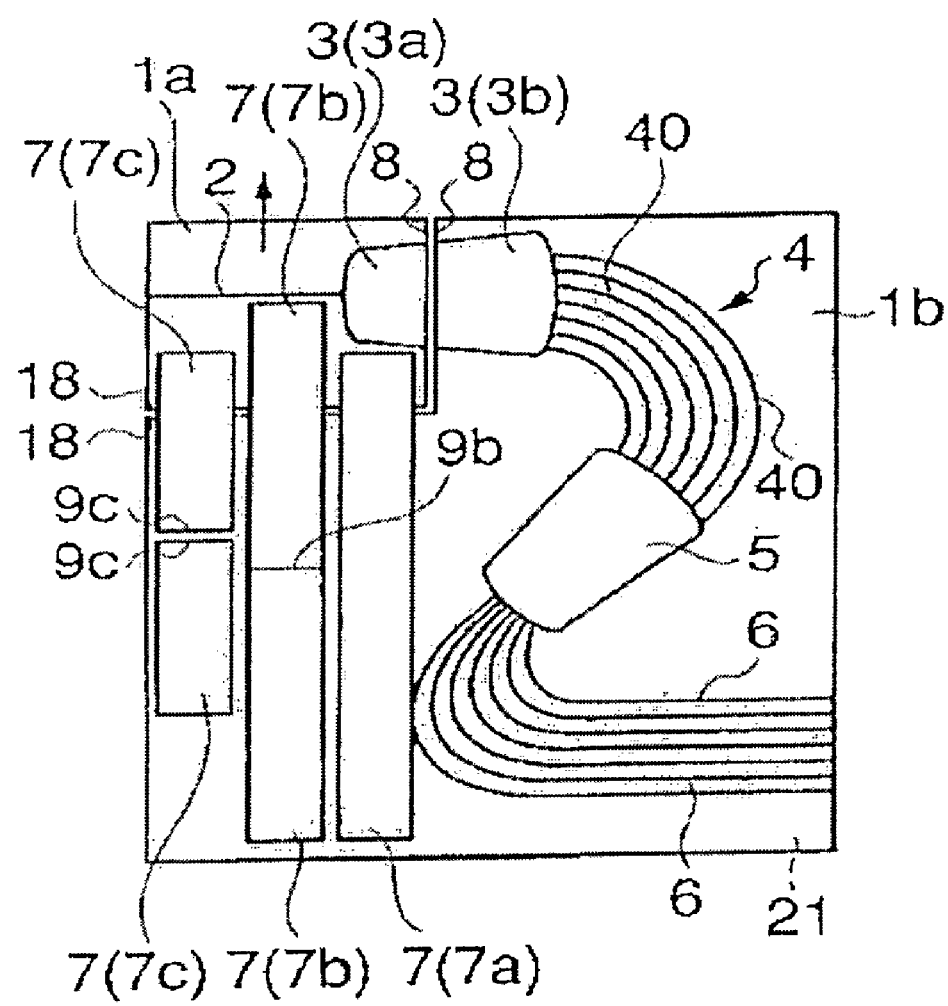
FIG. 1B is an explanatory view schematically illustrating the arrayed waveguide grating and its operation according to the embodiment of the present invention (where the temperature T of the arrayed waveguide grating satisfies T≧50° C.)
Figure 1C:
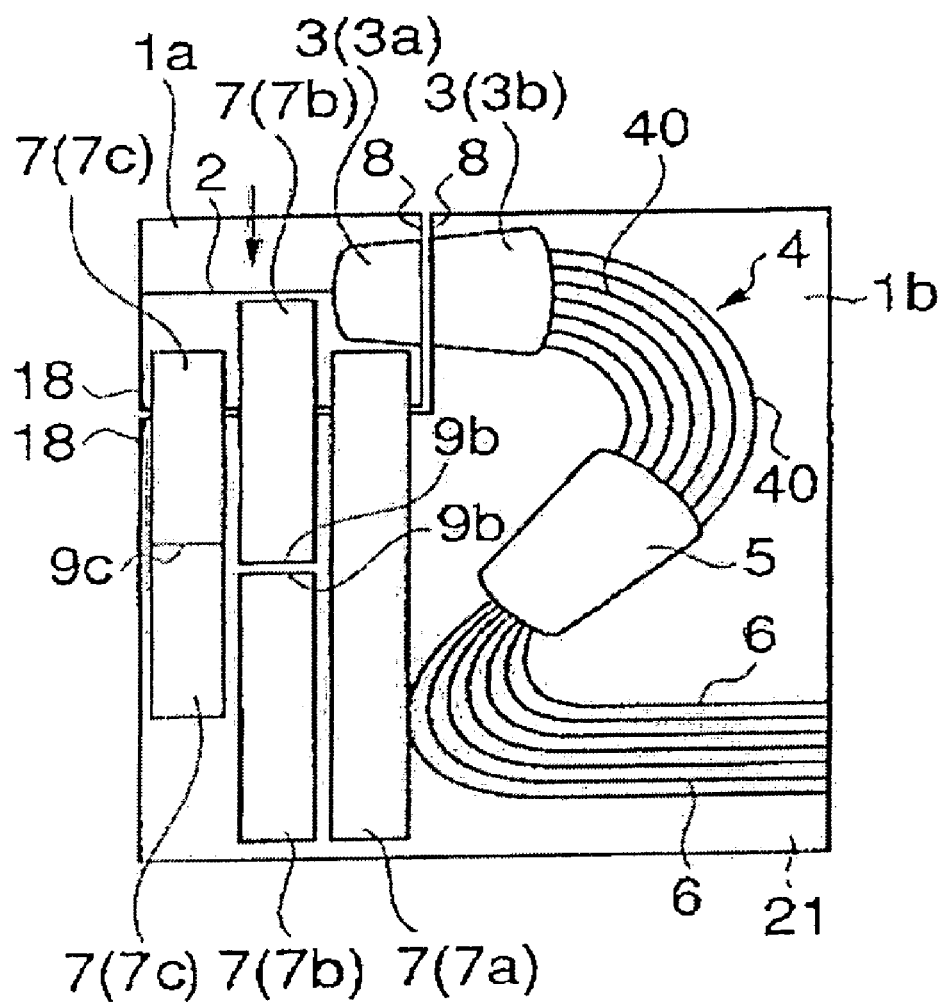
FIG. 1C is an explanatory view schematically illustrating the arrayed waveguide grating and its operation according to the embodiment of the present invention (where the temperature T of the arrayed waveguide grating satisfies T≦20° C.)

With reference to the drawings, embodiments of the present invention will now be described below. In the description below of the embodiments, same components as those in the conventional example are indicated by like reference numerals, and description thereof is simplified or omitted to avoid redundancy. FIGS. 1A to 1C are plan views each illustrating an arrayed waveguide grating according to an embodiment of the present invention, however, FIGS. 1A to 1C are of differing temperature T ranges of the arrayed waveguide grating.

Figure 12:
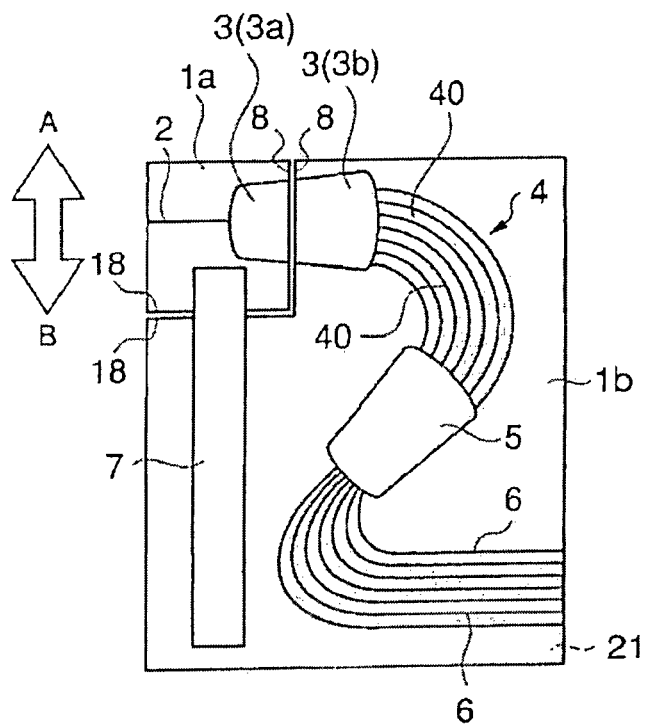
FIG. 12 is a plan, explanatory view showing an example of a conventionally proposed temperature-independent arrayed waveguide grating.
Figure 13:
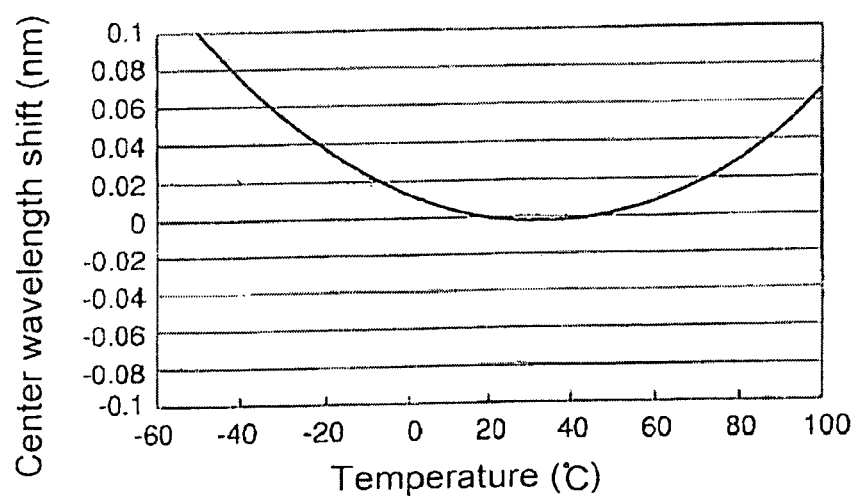
FIG. 13 is a graph showing the temperature dependence of the light transmission center wavelength of the conventionally proposed temperature-independent arrayed waveguide grating.

In these figures, the arrayed waveguide grating of this embodiment has a circuit configuration similar to that shown in FIG. 12, a first slab waveguide 3 consists of a divided slab waveguide 3a and a divided slab waveguide 3b divided along division surfaces 8 in a plane crossing the path of light passing through the first slab waveguide 3, and the division surfaces 8 and division surfaces 18 crossing the division surfaces 8 are used to divide the arrayed waveguide grating into a chip 1a and a chip 1b.

Here in this embodiment, a plurality of sliding members (in this embodiment, three sliding members are provided and shown like a first sliding member 7a, a second sliding member 7b and a third sliding member 7c) is provided for temperature-dependently moving at least one of the divided slab waveguides 3a and 3b (divided slab waveguide 3a in this embodiment) along the division surfaces 8 in such a direction as to reduce the temperature dependence of light transmission center wavelength of the arrayed waveguide grating (appropriate direction of the arrow A or B).

Each of the sliding members (7a, 7b and 7c) is provided across both of the chip 1a having the divided slab waveguide 3a and the optical input waveguide 2 and the chip 1b having the divided slab waveguide 3b and the arrayed waveguide 4, one end of each of the sliding members is fixed to the chip 1a and the other end is fixed to the chip 1b.

For example, FIG. 2(a) illustrates a cross-sectional configuration of the arrayed waveguide grating taken along the cut line C-C of FIG. 2(b), in which the third sliding member 7c is fastened to the chips 1a and 1b at joint parts 11 by an adhesive agent or the like. Besides, like the third sliding member 7c in these figures, the first and second sliding members 7a and 7b, respectively, are fastened to the chips 1a and 1b.

Further, the arrayed waveguide grating of this embodiment is designed to have the light transmission center wavelength shift of "0" at a temperature of 20° C. The sliding members 7a, 7b and 7c expand or contract in response to changes in ambient temperature of the arrayed waveguide grating. When the temperature exceeds 20° C., the sliding members 7a, 7b and 7c expand to move the divided slab waveguide 3a in the direction of the arrow A. Further, when the temperature falls below 20° C., the sliding members 7a, 7b and 7c contract to move the divided slab waveguide 3a in the direction of the arrow B.

Among the sliding members 7a, 7b and 7c, the first sliding member 7a is a unseparatable sliding member, and the second and third sliding members are separatable sliding members which are separatable at at least one part (here, the longitudinally center part of each sliding member).

In addition, the sliding members 7a, 7b and 7c are formed different in length. Where the length of the first sliding member 7a is L1, the length of the second sliding member 7b when it is not separated is L2 and the length of the third sliding member 7c when it is not separated is L3, the lengths satisfy L3<L1<L2.

In this embodiment, as the sliding members 7a, 7b and 7c are formed of different lengths, the sliding members 7a, 7b and 7c exhibit different expansion or contraction in response to temperature change.

In addition, the sliding members 7a, 7b and 7c are configured to move the divided slab waveguide 3a within their respective mutually-different temperature ranges in the operating temperature range of the arrayed waveguide grating. Here, the mutually-different temperature ranges may include common temperatures or may not include common temperature.

For example, in this embodiment, the operating temperature range of the arrayed waveguide grating is a range of −40° C. to 85° C. The first sliding member 7a is configured to move the divided slab waveguide 3a over the temperature range of −40° C. to 85° C. The second sliding member 7b is configured to move the divided slab waveguide 3a over the temperature range of 50° C. to 85° C. The third sliding member 7c is configured to move the divided slab waveguide 3a over the temperature range of −40° C. to 20° C. That is, in this embodiment the mutually-different temperature ranges include common temperatures.

Further, in this embodiment, the first sliding member 7a is an unseparatable sliding member and the second and third sliding members 7b and 7c are separatable sliding members, and they all are configured as described later. With this configuration, the first sliding member 7a, the second sliding member 7b and the third sliding member 7c are used to correspond to the different temperature ranges as described above.

In other words, each of the second and third sliding members 7b and 7c, which are separatable sliding members, has its separation surfaces 9b or 9c, and the separation surfaces 9b or 9c are arranged in contact with each other over its contact temperature range in the operating temperature range of the arrayed waveguide grating and are arranged separated from each other and facing each other over the other temperature ranges. In this embodiment, the second sliding member 7b and the third sliding member 7c are separatable sliding members of different contact temperature ranges.

Specifically, in the operating temperature range (−40° C. to 85° C.) of the arrayed waveguide grating, the second sliding member 7b has, as its contact temperature range, a higher-temperature side first temperature range (50° C. or more) and the third sliding member 7c has, as its contact temperature range, a third temperature range (20° C. or less) spaced from the first temperature range in the operating temperature range of the arrayed waveguide grating. Here, each temperature range is not limited specifically, and may be set appropriately.

Further, in this embodiment, the expansion or contraction of the separatable sliding members 7b and 7c and the expansion or contraction of the unseparatable sliding member 7a are used to give differing temperature-dependent sliding distances to the divided slab waveguide 3a over the respective first, second and third temperature ranges in the operating temperature range of the arrayed waveguide grating, and then, each sliding distance of the divided slab waveguide 3a caused by the expansion or contraction of the sliding members (7a, 7b and 7c) due to the temperature change is defined as a temperature-dependence reduction amount which varies as temperature changes so as to reduce temperature dependence of the light transmission center wavelength of the arrayed waveguide grating.

Specifically, in the first temperature range, sliding or moving of the divided slab waveguide 3a is performed in response to expansion or contraction of the first sliding member 7a and the second sliding member 7b. In the second temperature range between the first temperature range and the third temperature range, sliding or moving of the divided slab waveguide 3a is performed in response to expansion or contraction of the first sliding member 7a only. In the third temperature range, sliding or moving of the divided slab waveguide 3a is performed in response to expansion or contraction of the first sliding member 7a and the second sliding member 7c. With this configuration, the sliding distance of the divided slab waveguide 3a along the division surfaces 8 is used as a temperature-dependence reduction amount varying with change in temperatures.

The inventors of the present application have studied actualization of temperature independence of the arrayed waveguide grating and confirmed that the temperature dependence of the light transmission center wavelength of the arrayed waveguide grating (wavelength shift) is expressed by a downward-convex curve where the positive direction is upward. They have also confirmed that in order to reduce the temperature dependence of the light transmission center wavelength of the arrayed waveguide grating by moving the divided slab waveguide divided along the division surfaces in the plane crossing the path of light passing through the slab waveguide, it is essential only that using these temperature characteristics, the sliding distance dx is changed with change in temperatures as shown in FIG. 10 (in FIG. 10, quadratic curve).

Figure 10:
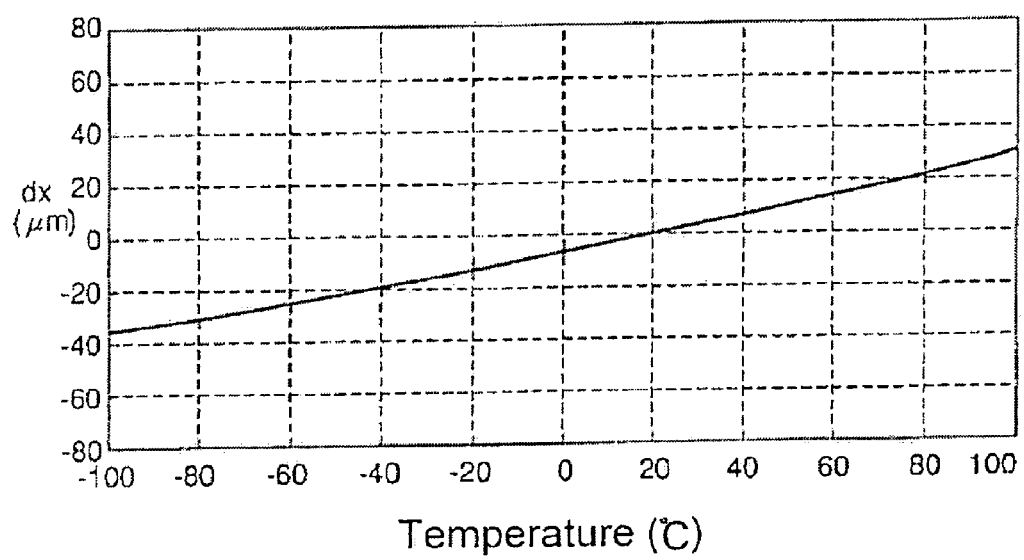
FIG. 10 is a graph of sliding distances corresponding to temperatures which enables effective reduction of temperature dependence of a light transmission center wavelength of the arrayed waveguide grating.
Figure 11:
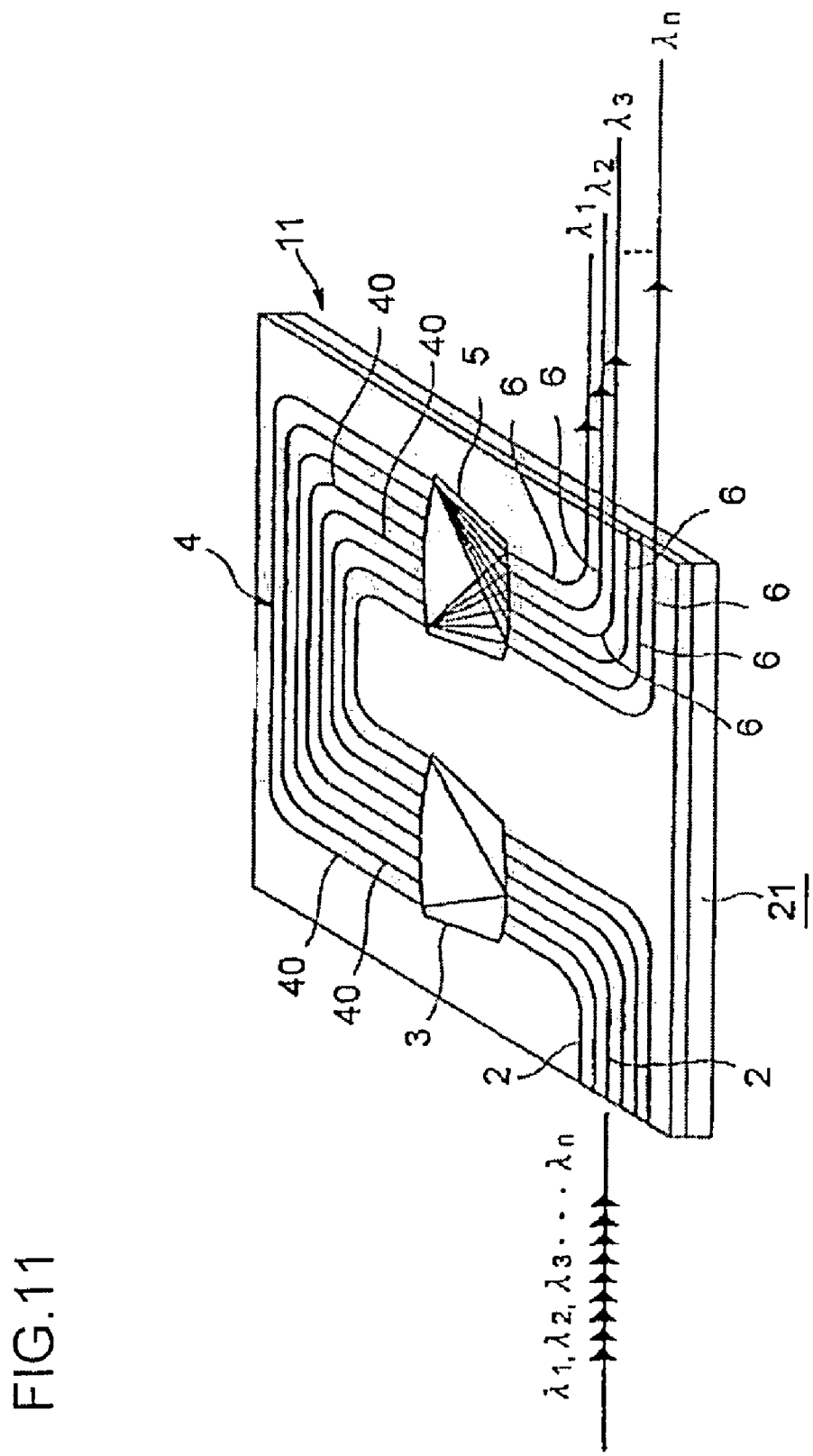
FIG. 11 is a perspective view illustrating a structural example of the arrayed waveguide grating.

Here, the characteristics shown in FIG. 10 are obtained of the arrayed waveguide grating which performs multiplexing/demultiplexing of 42 wavelength light signals with 100 GHz spacing. The sliding distance dx is expressed by the quadratic equation 1 where the temperature is T.

$$dx \approx 4.642 \times 10^{-4} T^2 + 0.325T - 6.704 \qquad \text{[Equation 1]}$$

Then, this study is used as a basis to have presented the configuration of the present invention including the present embodiment. In this embodiment, the unseparatable first sliding member 7a, and the second and third sliding members 7b and 7c, which are separatable at one part and have separation surfaces arranged in contact with each other in their respective contact temperature ranges in the operating temperature range, are provided. These sliding members 7a, 7b and 7c are used to move the divided slab waveguide 3a along the division surfaces 8, and the sliding distance of the divided slab waveguide 3a along the division surfaces 8 is defined as a temperature-dependence reduction amount (for example, corresponding to each value in FIG. 10).

Therefore, it is possible to efficiently reduce the temperature dependence of the light transmission center wavelength of the arrayed waveguide grating.

The following description is made specifically about the operation of reducing of the temperature dependence of light transmission center wavelength of the arrayed waveguide grating of this embodiment as well as reference to effects thereof.

As illustrated in FIG. 1A, in the second temperature range between the first temperature range and the third temperature range, the second sliding member 7b and the third sliding member 7c are arranged with their separation surfaces separated, and therefore, sliding is performed only in response to expansion or contraction of the first sliding member 7a. Here in this embodiment, when temperatures in the second temperature range are indicated by $T_2$, the relation 20° C.$<T_2<$50° C. is established. As the second temperature range is a higher temperature range exceeding 20° C., the first siding member 7a expands to temperature-dependently move the divided slab waveguide 3a in the direction of the arrow A in FIG. 1A in response to the expansion of the sliding member 7a.

Further, in the first temperature range, as illustrated in FIG. 1B, the second sliding member 7b is arranged with its separation surfaces in contact with each other. Therefore, sliding is performed in response to both the expansion/contraction of the second sliding member 7b and the expansion/contraction of the unseparatable sliding member 7a. In the first temperature range, as the third sliding member 7c is arranged with the separation surfaces 9c and 9c spaced from each other, it is not involved in sliding of the divided slab waveguide 3a.

Further, when temperatures in the first temperature range are expressed as T1, in this embodiment, the relation 50° C.≦$T_1$, is established. As the first temperature range is positioned higher than 20° C., the first sliding member 7a and the second sliding member 7b expand together to move the divided slab waveguide 3a in the direction of the arrow A in FIG. 1A. Here, as the length L2 of the second sliding member 7b is longer than the length L1 of the first sliding member 7a, the temperature-based expansion of the second sliding member 7b is larger than that of the first sliding member 7a. This expansion of the second sliding member 7b acts the divided slab waveguide 3a to be moved in the A direction temperature-dependently by the temperature-based sliding distance which is larger than that of the second temperature range.

On the other hand, in the third temperature range, for example, as illustrated in FIG. 1C, the third sliding member 7c is arranged with its separation surfaces in contact with each other. With this arrangement, sliding is performed based on the expansion/contraction of the third sliding member 7c and the expansion/contraction of unseparatable first sliding member 7a. In the third temperature range, the second sliding member 7b are arranged with its separation surfaces 9b spaced away from each other and therefore, does not affect movement of the divided slab waveguide 3a.

In this embodiment, when temperatures in the third temperature range are referred to as $T_3$, the relation 20° C.≧$T_3$ is established and the third temperature range is positioned 20° C. or less, the first sliding member 7a and the third sliding member 7c contract together to move the divided slab waveguide 3a in the direction of the arrow B of FIG. 1A.

Here, the length L3 of the third sliding member 7c is shorter than the length L1 of the first sliding member 7a, the temperature-based contraction (amount of contraction which increases as the temperature is lowered) is smaller in the third sliding member 7c than in the first sliding member 7a. This contraction of the third sliding member 7c acts to reduce the sliding distance of the divided slab waveguide 3a in the direction of the arrow B, and this sliding distance becomes smaller than that of the divided slab waveguide 3a moved by only the first sliding member 7a.

Here, even at temperatures equal to or below 20° C., if the temperature rises (for example, from 0° C. to 20° C.), the temperature before rising is used as a reference (for example, 0° C. is a reference temperature), the first and third sliding members 7a and 7c expand together and the divided slab waveguide 3a moves from the reference position in the direction of the arrow A. Here, also in this case, the expansion of the third sliding member 7c is smaller than that of the first sliding distance 7a, which causes the temperature-based sliding distance of the divided slab waveguide 3a in the direction of the arrow A in response to the temperature rise to be reduced as compared with the sliding distance of the divided slab waveguide 3a moved by only the first sliding member 7a.

With this operation, in other words, as the first, second and third sliding members 7a, 7b and 7c, respectively, move the divided slab waveguide 3a correspondingly to the mutually-different first, second and third temperature ranges in the operating temperature range, in this embodiment, as mentioned above, the sliding distance of the divided slab waveguide 3a can be used as a temperature-dependence reducing amount that varies with change in temperatures so as to reduce the temperature dependence of the light transmission center wavelength of the arrayed waveguide grating.

Accordingly, in this example, the temperature dependence of the light transmission center wavelength of the arrayed waveguide grating, that is, the temperature dependence expressed by a quadratic curve having a downward-convex curve (positive direction is upward) of a shift amount of the light transmission center wavelength due to temperature change can be reduced efficiently with use of quadratic-curve-shaped sliding distances by the sliding members 7a, 7b and 7c.

Further, according to this embodiment, as the plural sliding members 7a, 7b and 7c are formed different in length, this length difference provides the sliding members 7a, 7b and 7c different expansion and contraction in response to the temperature change, thereby allowing the above-described effects to be exerted with the simple configuration.

Furthermore, according to this embodiment, of the plural sliding members, the two sliding members 7b and 7c are separatable sliding members each separatable at one part and the sliding member 7a is unseparatable sliding member 7a. The separatable sliding members 7b and 7c are arranged with their two separation surfaces 9b and 9c which are in contact with each other within their contact temperature ranges different from each other in the operating temperature range of the arrayed waveguide grating and separated from each other in the other temperature ranges. With this configuration, as described above, it is possible to adjust the sliding distance of the divided slab waveguide 3a accurately over the plural temperature ranges in the operating temperature range and to use the sliding distance as a temperature-dependence reduction amount which varies as temperature changes.

EXAMPLE

Next description is made about an example of the above-described embodiment. This example adopts plane configuration as shown in FIGS. 1A to 1C, in which the 100-GHz× 32-ch Gaussian type arrayed waveguide grating chip is fabricated having optical input waveguides 2, first slab waveguide 3, arrayed waveguide 4, second slab waveguide 5 and optical output waveguides 6 of silica-based glass deposited on the silicon substrate 21 using flame hydrolysis deposition, photolithography, reactive ion etching, and the first slab waveguide 3 is cut by a dicing device and sliding members 7a, 7b and 7c are provided.

Circuit parameters of the arrayed waveguide grating are shown in Table 1. Here, the channel spacing is multiplexing/demultiplexing spacing.

TABLE 1

| Parameter | Value |
| --- | --- |
| Channel spacing | 100 GHz |
| Channel number | 32 |
| Relative refractive index difference | 0.8% |
| Focal length of slab waveguide: $L_f$ | 17.2 mm |
| Length difference between adjacent arrayed waveguides: ΔL | 31.0 μm |
| Pitch between adjacent arrayed waveguides at the end of arrayed waveguide: d | 13.8 μm |
| Diffraction order: m | 29 |

The first sliding member 7a is made of a copper plate (linear expansion coefficient $1.7 \times 10^{-5}$), which is used to connect the cut arrayed waveguide grating chips. Then, the length L1 of the first sliding member 7a is determined by using the following equation (equation 2) which expresses the compensation dx of the focal position required for the center wavelength shift dλ due to temperature change dT.

$$dx = \frac{L_f \Delta L}{n_s d \lambda_0} n_g \frac{d\lambda}{dT} \Delta T \quad \text{[Equation 2]}$$

In the equation, $L_f$ is a focal length of slab waveguide ΔL is a length difference between adjacent arrayed waveguides, $n_s$ is an effective refractive index of slab waveguide, d is a pitch between adjacent arrayed waveguides at the end of arrayed waveguide, $n_g$ is a group refractive index of arrayed waveguide and ΔT is a temperature change.

With use of the circuit parameters and the above-mentioned equation (equation 2), L1 of 16.2 mm is derived.

Figure 5:
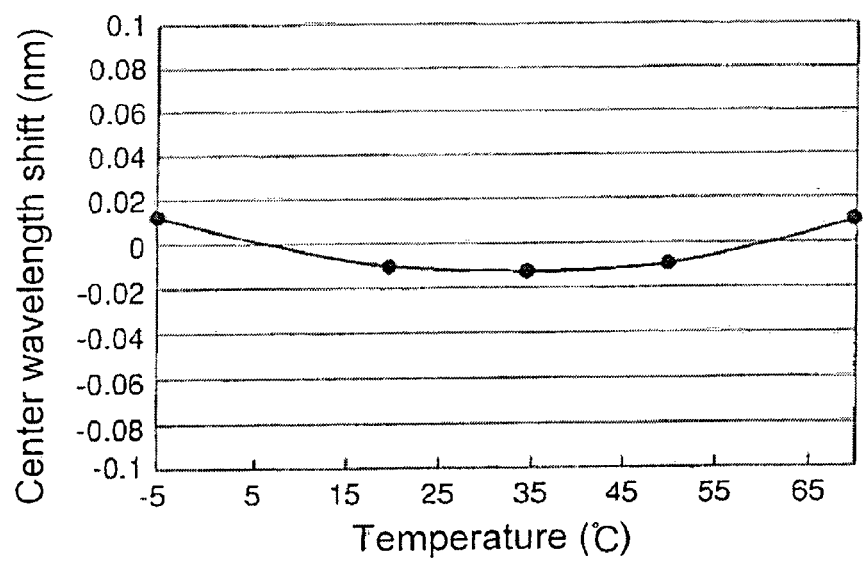
FIG. 5 is a graph showing temperature dependence of light transmission center wavelength of a temperature-independent arrayed waveguide grating having only one sliding member.

For comparison, temperature-dependent light transmission center wavelength shift is obtained of an arrayed waveguide grating having only a sliding member 7a and no sliding members 7b and 7c, which results are shown in FIG. 5. As seen from this figure, the temperature dependence of about 0.015 nm is found over the temperature range from −5° C. to 70° C.

Then, to make up the configuration of this example, in other words, the configuration shown in FIGS. 1A to 1C, the sliding members 7b and 7c are connected adjacent to the sliding member 7a. Here, the lengths L2 and L3 of the sliding member 7b and 7c are 19.4 mm and 13.0 mm, respectively. In addition, the second sliding member 7b is connected to the arrayed waveguide grating chip at 50° C. in such a manner that its separation surfaces 9b abut against each other with no gap created therebetween. On the other hand, the third sliding member 7c is connected to the arrayed waveguide grating chip at 20° C. in such a manner that its separation surfaces 9c abut against each other with no gap created therebetween.

Figure 3:
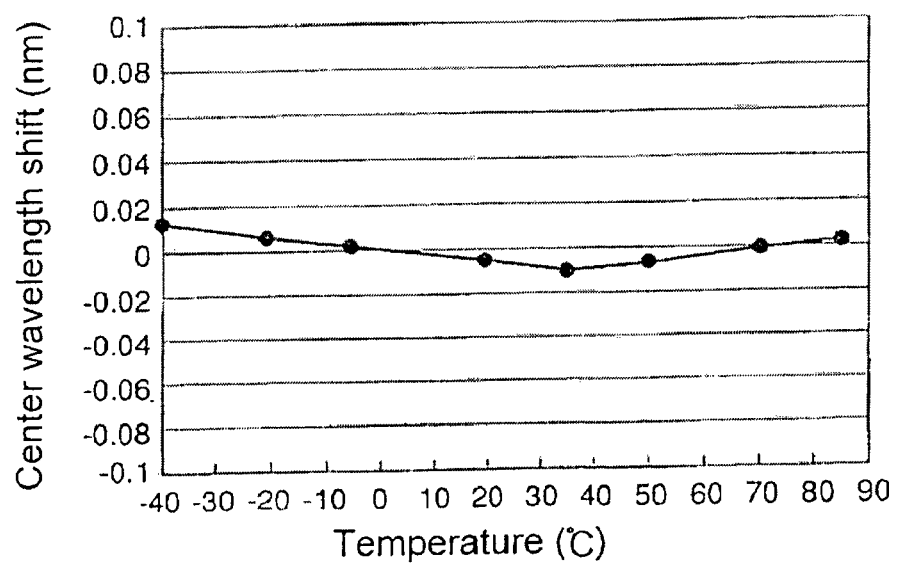
FIG. 3 is a graph showing temperature dependence of light transmission center wavelength of an example of the above-mentioned embodiment (ranging from −40° C. to 85° C.)
Figure 4:
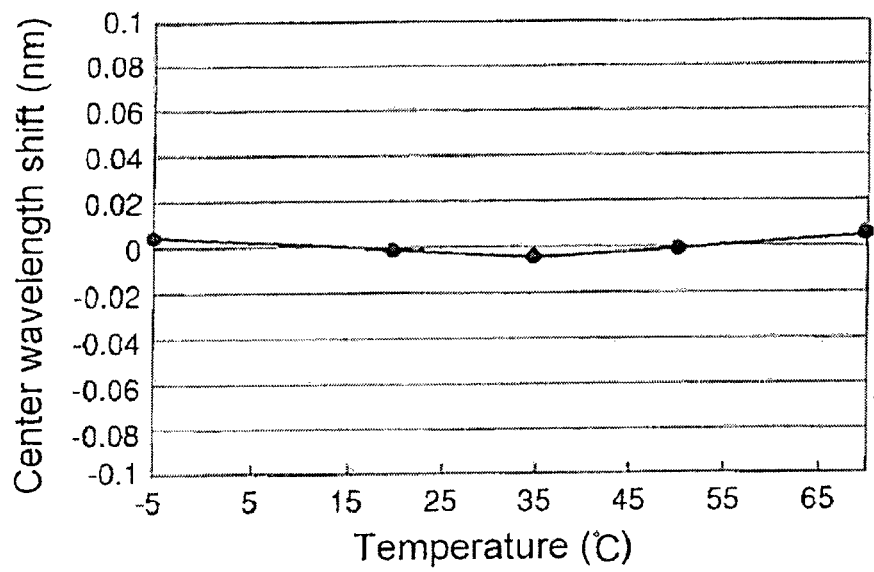
FIG. 4 is a graph showing temperature dependence of light transmission center wavelength of an example of the above-mentioned embodiment (ranging from −5° C. to about 70° C.)

FIGS. 3 and 4 show temperature characteristics of the arrayed waveguide grating of this embodiment. The temperature dependence of not more than ±0.005 nm is achieved over the temperature range from −5° C. to 70° C. (see FIG. 4). It is also seen that the center wavelength fluctuation of not more than ±0.015 is achieved over a temperature range of −40° C. to 85° C. (see FIG. 3). This example confirms effects of the above-described embodiment.

Figure 6:
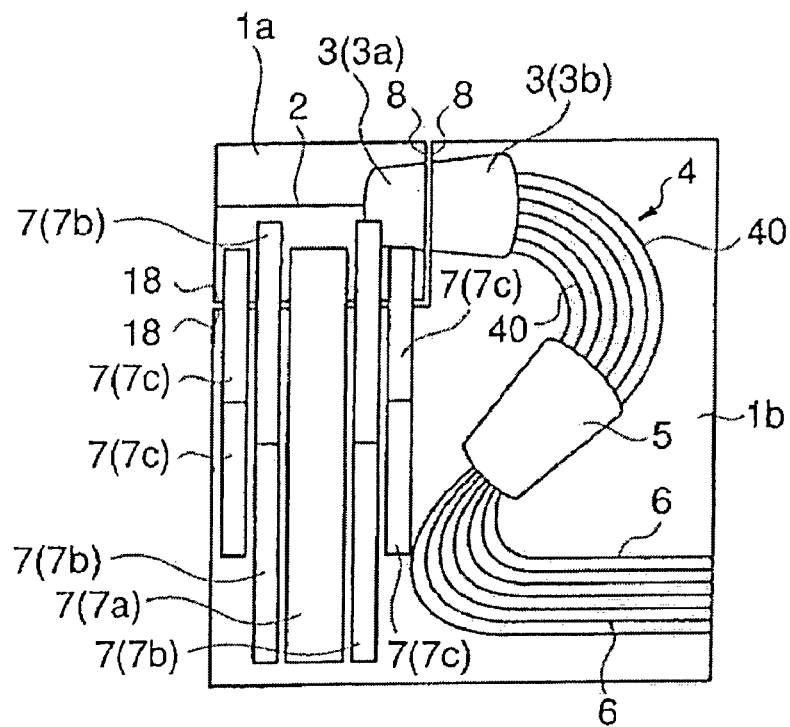
FIG. 6 is an explanatory plan view schematically illustrating an arrayed waveguide grating according to another embodiment of the present invention.

Here, the present invention is not limited to the above-described embodiment and example, and may be embodied in various forms. For example, the number of plural sliding members 7 arranged is not limited to a specific number and may be set to any number appropriately, for example, two, or four or more. For example, FIG. 6 shows five sliding members 7 provided, consisting of a sliding member 7a and sliding members 7b and 7c each obtained by dividing the sliding member of the above-described embodiment into two pieces and arranged one at each side of the sliding member 7a. This configuration preferably has advantage of preventing generation of rotation moment during expansion or contraction of the sliding member 7a.

Further, in this embodiment, the lengths of the sliding members 7a, 7b and 7c satisfy the relation of L3<L1<L2. However, each of the lengths of the sliding members 7a, 7b and 7c may be determined as appropriate.

Figure 7:
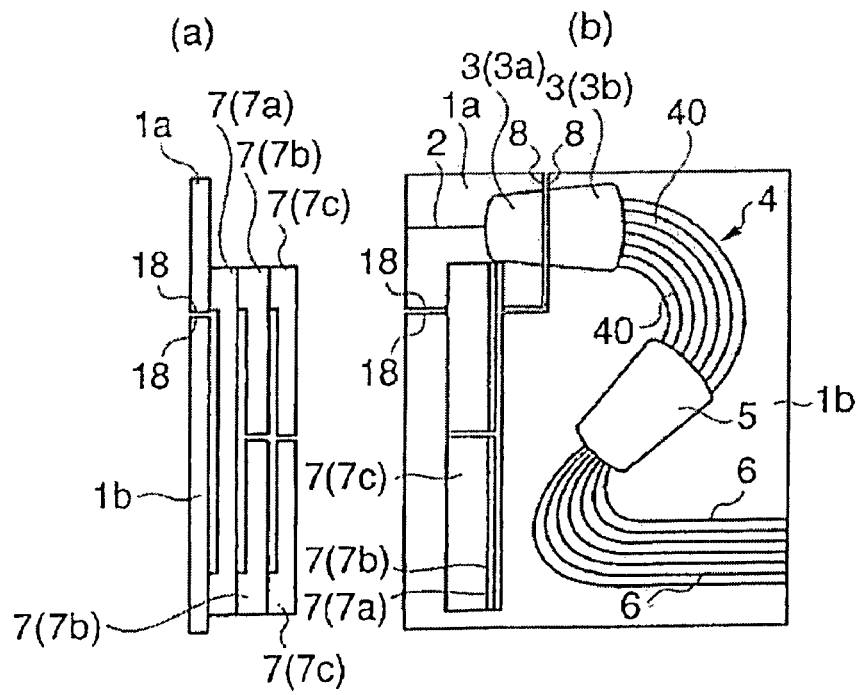
FIGS. 7(a) and 7(b) are a cross-sectional view and a plan view, respectively, schematically illustrating an arrayed waveguide grating according to yet another embodiment of the present invention.

For example, if the three sliding members 7a, 7b and 7c are made of different materials, the sliding members 7a, 7b and 7c exhibit different expansion and contraction in response to temperature change even when the lengths thereof are equal to each other as illustrated in FIG. 7. In the example shown in FIG. 7, the sliding member 7a is made of copper, the sliding member 7b is made of aluminum and the sliding member 7c is made of stainless. With this configuration, the degrees of expansion or contraction in response to temperature change of the sliding members 7a, 7b and 7c meet the relation of sliding member 7b>sliding member 7a>sliding member 7c.

Further, the plural sliding members 7 have no limitations of the quantity, length, thickness, material, shape and the like and may be designed appropriately as long as the sliding members 7 exhibit different expansion or contraction in response to temperature change.

Furthermore, the joint parts of the sliding members 7 are not limited to those in the embodiment and may be determined appropriately. Each of the sliding members 7 only has to be connected to both of divided parts of the arrayed waveguide grating (chips 1a and 1b) so as to be able to move the divided slab waveguide appropriately.

Furthermore, the sliding members 7b and 7c are separated into two with respective separation surfaces 9b and 9c in the center position in the above-described embodiment. However, the separating position is not limited to this position and the sliding members 7b and 7c may be separated at any position. Besides, the number of separation pieces is not limited to two in this embodiment and may be three or more.

Figure 2:
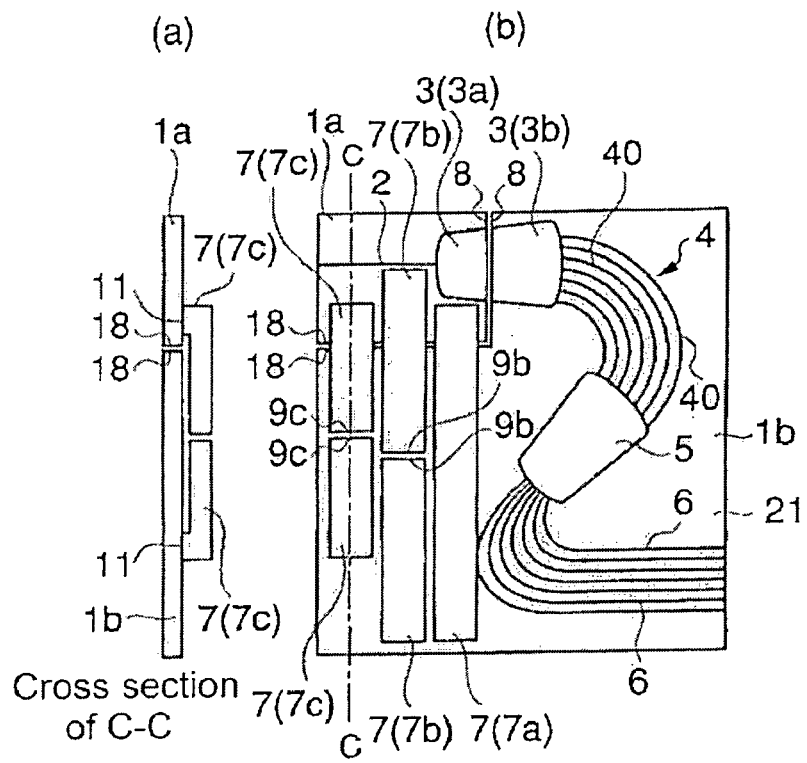
FIGS. 2(a) and 2(b) are views for showing a cross-sectional configuration of the arrayed waveguide grating of the above-mentioned embodiment.
Figure 8:
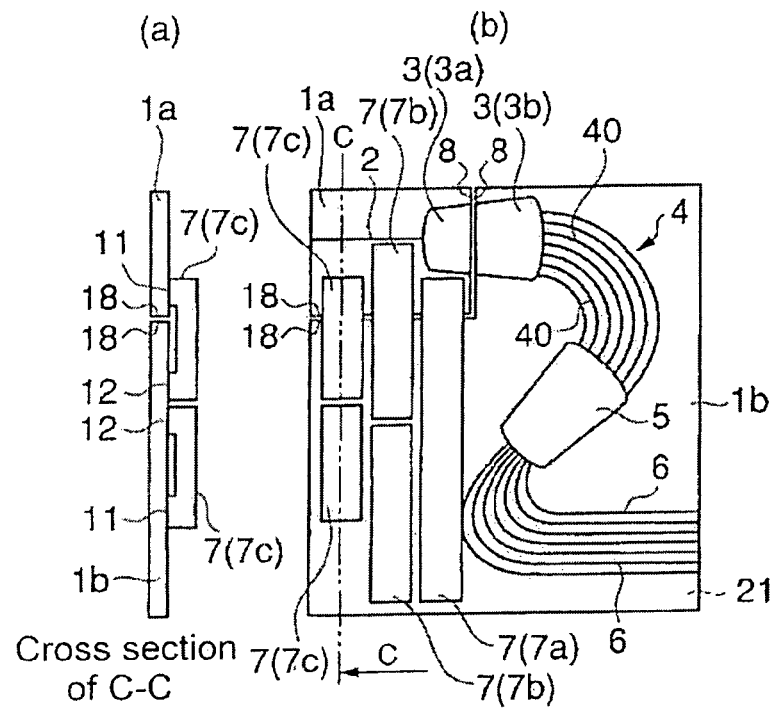
FIGS. 8(a) and 8(b) are a cross-sectional view and a plan view, respectively, schematically illustrating an arrayed waveguide grating according to yet another embodiment of the present invention.

Furthermore, in this embodiment, the sliding members 7b and 7c are configured to have cross sections shown in FIG. 2. However, the cross-sectional shape of each separatable sliding member such as the sliding members 7b and 7c has no specific limitation and may be determined as appropriate, for example, the cross section shown in FIG. 8(a). FIG. 8(a) is a cross-sectional view of FIG. 8(b) taken along the line C-C, and in FIG. 8(a), the third sliding member 7c is connected to the chips 1a and 1b at the joint parts 11 and not connected thereto at non-joint parts denoted by reference numeral 12. The second sliding member 7b is also connected in the same manner.

Figure 9:
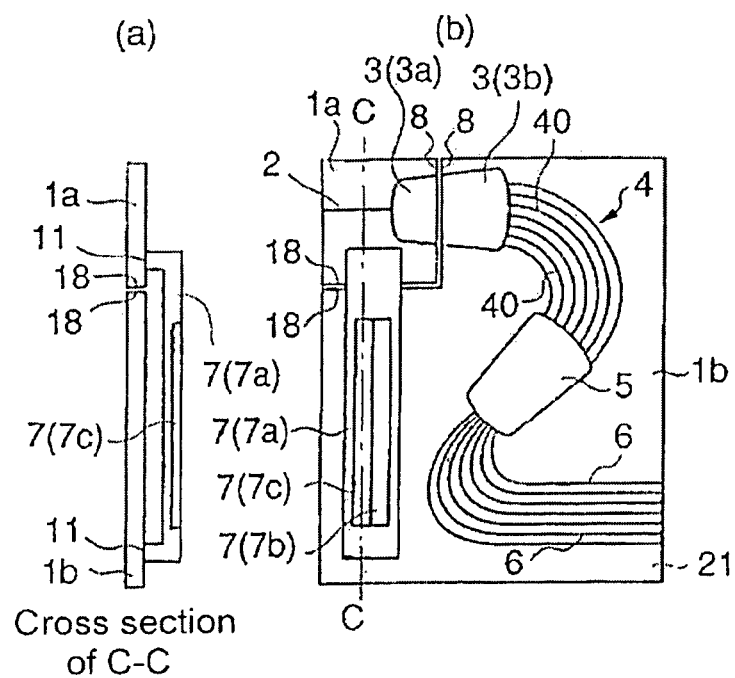
FIGS. 9(a) and 9(b) are a cross-sectional view and a plan view, respectively, schematically illustrating an arrayed waveguide grating according to yet another embodiment of the present invention.

Furthermore, arrangement of the plural sliding members 7 may be such as shown in FIG. 9, in which the second sliding member 7b and the third sliding member 7c are arranged inside the frame-shaped first sliding member 7a. Here, FIG. 9(b) is a plan view of this exemplary configuration and FIG. 9(a) is a cross-sectional view of FIG. 9(b) taken along the line C-C, and in FIG. 9(a) in which each of the second and third sliding members 7b and 7c are inserted or fixed at their both ends inside the first sliding member 7a. Here, when the sliding members 7 are provided as shown in FIGS. 9(a) and 9(b), the first sliding member 7a may be formed to have a wavelike curve face along the longitudinal direction, thereby preferably preventing loads from being applied at joint parts.

Here in the example illustrated in FIG. 9, the sliding member 7a is made of copper, the sliding member 7b is made of aluminum and the sliding member 7c is made of stainless. However, the materials of these sliding members 7 have no limitation and maybe determined as appropriate. The materials used may be two, four or more in number.

Further, in the above-described embodiment, shift of the light transmission center wavelength of the arrayed waveguide grating with change in temperatures is expressed by a quadratic downward-convex curve where the positive direction is upward, and with use of this temperature dependence, the sliding distance of the divided slab waveguide 3a caused by the expansion or contraction of the plural sliding members 7 due to temperature change is defined as a temperature-dependence reduction amount which varies as temperature changes so as to reduce the temperature dependence of the light transmission center wavelength of the arrayed waveguide grating. However, the sliding distance of the divided slab waveguide caused by the sliding members 7 may be determined as appropriate. In other words, according to the present invention, provision of the plural sliding members 7 makes it possible to use the sliding distance of the divided slab waveguide as a temperature-dependence reduction amount, which varies as temperature changes, so as to reduce the temperature dependence of the light transmission center wavelength of the arrayed waveguide grating based on change in the temperature dependence of the arrayed waveguide grating even when the temperature dependence of the arrayed waveguide grating is expressed linearly or in a quadratic curve or even other shape.

Furthermore, in the above-described embodiment, the first slab waveguide 3 is divided into divided slab waveguides 3a and 3b. However, the second slab waveguide 5 may be divided or both of the first and second slab waveguides may be divided. In addition, the sliding member 7 may slide one of the divided slab waveguides along the separation surfaces or slide both of the divided slab waveguides along the separation surface.

The present specification is based on Japanese Patent Application No. 2005-254672 filed on Sep. 2, 2005, the entire contents of which are entirely incorporated by reference herein.

The invention claimed is:

1. An arrayed waveguide grating having a waveguide configuration formed on a substrate, the waveguide configuration including:
    one or more optical input waveguides arranged side-by-side;
    a first slab waveguide connected to an output side of the one or more optical input waveguides;
    an arrayed waveguide, connected to an output side of the first slab waveguide, for receiving light from the first slab waveguide to propagate the light therethrough, the arrayed waveguide having a plurality of waveguides of different lengths;
    a second slab waveguide connected to an output side of the arrayed waveguide; and
    one or more optical output waveguides arranged side-by-side and connected to an output side of the second slab waveguide, wherein
    at least one of the first slab waveguide and the second slab waveguide is divided along division surfaces in a plane crossing a path of the light passing through the corresponding slab waveguide into divided slab waveguides,
    a plurality of sliding members are provided for temperature-dependently moving at least one of the divided slab waveguides along the division surfaces in such a direction as to reduce temperature dependence of a light transmission center wavelength of the arrayed waveguide grating,
    the sliding members are formed of members which exhibit different expansion or contraction in response to temperature change, and
    the sliding members move the divided slab waveguide within respective mutually-different temperature ranges in an operating temperature range of the arrayed waveguide grating.

2. The arrayed waveguide grating of claim 1, wherein at least two of the sliding members are formed different in length from each other.

3. The arrayed waveguide grating of claim 1 or 2, wherein at least two of the sliding members are members of mutually-different materials.

4. The arrayed waveguide grating of claim 1 or 2, wherein
    at least one of the sliding members is a separatable sliding member which is separatable at at least one part,
    at least one of the sliding members is unseparatable sliding member, and
    the separatable sliding member is arranged with separation surfaces which are in contact with each other within a contact temperature range in the operating temperature range of the arrayed waveguide grating and are arranged separated from each other and facing each other in other temperature ranges.

5. The arrayed waveguide grating of claim 4, wherein
    the separatable sliding member comprises a plurality of separatable sliding members having mutually-different contact temperature ranges, and
    the expansion or contraction of the separatable sliding members within the respective contact temperature ranges and the expansion or contraction of the unseparatable sliding member are used to change the sliding distance of the divided slab waveguide correspondingly to the temperature change within each of the temperature ranges in the operating temperature range of the arrayed waveguide grating.

6. The arrayed waveguide grating of claim 5, wherein the sliding members comprise an unseparatable-type first sliding member, a second sliding member having, as the contact temperature range, a first temperature range which is positioned at a higher-temperature side in the operating temperature range of the arrayed waveguide grating, and a third sliding member having, as the contact temperature range, a third temperature range which is positioned away from the first temperature range and at a lower-temperature side in the operating temperature range of the arrayed waveguide grating,
    in the first temperature range, sliding movement is performed corresponding to the expansion or contraction of the first sliding member and the second sliding member,
    in a second temperature range between the first temperature range and the third temperature range, the sliding movement is performed corresponding to the expansion or contraction of the first sliding member, and
    in the third temperature range, the sliding movement is performed corresponding to the expansion or contraction of the first sliding member and the third sliding member.

7. The arrayed waveguide grating of claim 3, wherein
    at least one of the sliding members is a separatable sliding member which is separatable at at least one part,
    at least one of the sliding members is unseparatable sliding member, and
    the separatable sliding member is arranged with separation surfaces which are in contact with each other within a contact temperature range in the operating temperature range of the arrayed waveguide grating and are arranged separated from each other and facing each other in other temperature ranges.

8. The arrayed waveguide grating of claim 7, wherein the separatable sliding member comprises a plurality of separatable sliding members having mutually-different contact temperature ranges, and
    the expansion or contraction of the separatable sliding members within the respective contact temperature ranges and the expansion or contraction of the unseparatable sliding member are used to change the sliding distance of the divided slab waveguide correspondingly to the temperature change within each of the temperature ranges in the operating temperature range of the arrayed waveguide grating.

9. The arrayed waveguide grating of claim 8, wherein the sliding members comprises a unseparatable-type first sliding member, a second sliding member having, as the contact temperature range, a first temperature range which is positioned at a higher-temperature side in the operating temperature range of the arrayed waveguide grating, and a third sliding member having, as the contact temperature range, a third temperature range which is positioned away from the first temperature range and a lower-temperature side in the operating temperature range of the arrayed waveguide grating, in the first temperature range, sliding movement is performed corresponding to the expansion or contraction of the first sliding member and the second sliding member, in a second temperature range between the first temperature range and the third temperature range, the sliding movement is performed corresponding to the expansion or contraction of the first sliding member, and in the third temperature range, the sliding movement is performed corresponding to the expansion or contraction of the first sliding member and the third sliding member.

* * * * *